US011410433B2

(12) United States Patent
Hassan et al.

(10) Patent No.: US 11,410,433 B2
(45) Date of Patent: Aug. 9, 2022

(54) SEMANTICALLY-CONSISTENT AUGMENTED TRAINING DATA FOR TRAFFIC LIGHT DETECTION

(71) Applicant: Robert Bosch GmbH, Stuttgart (DE)

(72) Inventors: Eman Hassan, Bloomington, IN (US); Nanxiang Li, San Mateo, CA (US); Lin Ren, Cupertino, CA (US)

(73) Assignee: Robert Bosch GbmH, Stuttgart (DE)

( * ) Notice: Subject to any disclaimer, the term of this patent is extended or adjusted under 35 U.S.C. 154(b) by 309 days.

(21) Appl. No.: 16/836,433

(22) Filed: Mar. 31, 2020

(65) Prior Publication Data
US 2021/0303886 A1 Sep. 30, 2021

(51) Int. Cl.
| | |
|---|---|
| *G06V 20/58* | (2022.01) |
| *G06K 9/62* | (2022.01) |
| *G06T 19/00* | (2011.01) |
| *G06N 3/08* | (2006.01) |
| *G06T 11/60* | (2006.01) |

(Continued)

(52) U.S. Cl.
CPC .......... *G06V 20/584* (2022.01); *G06K 9/623* (2013.01); *G06K 9/6256* (2013.01); *G06N 3/088* (2013.01); *G06N 20/20* (2019.01); *G06T 7/70* (2017.01); *G06T 11/60* (2013.01); *G06T 19/006* (2013.01);
(Continued)

(58) Field of Classification Search
None
See application file for complete search history.

(56) References Cited

U.S. PATENT DOCUMENTS

2014/0270355 A1\* 9/2014 Terrazas ............. G06Q 30/0205
382/103
2018/0218524 A1\* 8/2018 Abalharth .............. G01C 11/04
(Continued)

OTHER PUBLICATIONS

T. Senlet and A. Elgammal, "A framework for global vehicle localization using stereo images and satellite and road maps," 2011 IEEE International Conference Computer Vision Workshops (ICCV Workshops), 2011, pp. 2034-2041, doi: 10.1109/ICCVW.2011. 6130498. (Year: 2011).\*

(Continued)

*Primary Examiner* — Emily C Terrell
*Assistant Examiner* — Nathan J Bloom
(74) *Attorney, Agent, or Firm* — Michael Best & Friedrich LLP

(57) ABSTRACT

Methods, systems, and non-transitory computer-readable media for generating augmented data to train a deep neural network to detect traffic lights in image data. The method includes receiving a plurality of real roadway scene images and selecting a subset of the plurality of real roadway scene images. The method also includes selecting an image from the subset and determining a distribution indicting how likely each location in the selected image can contain a traffic light. The method further includes selecting a location in the selected image by sampling the distribution and superimposing a traffic light image onto the selected image at the selected location to generate an augmented roadway scene image. The method also includes processing each image in the subset to generate a plurality of augmented roadway scene images. The method further includes training a deep neural network model using the pluralities of real and augmented roadway scene images.

20 Claims, 9 Drawing Sheets

(51) Int. Cl.
G06V 20/17 (2022.01)
G06T 7/70 (2017.01)
G06N 20/20 (2019.01)

(52) U.S. Cl.
CPC .... *G06V 20/17* (2022.01); *G06T 2207/10032* (2013.01)

(56) References Cited

U.S. PATENT DOCUMENTS

| | | | | |
|---|---|---|---|---|
| 2018/0286233 | A1* | 10/2018 | Suzuki | G08G 1/096783 |
| 2019/0050648 | A1* | 2/2019 | Stojanovic | G06V 20/13 |
| 2021/0133485 | A1* | 5/2021 | Kubota | G06V 10/82 |
| 2021/0156704 | A1* | 5/2021 | Gibson | G01C 21/3848 |
| 2021/0158699 | A1* | 5/2021 | Yang | G08G 1/0145 |

OTHER PUBLICATIONS

Zhang X, Du S, Wang Q. Hierarchical semantic cognition for urban functional zones with VHR satellite images and POI data. ISPRS Journal of Photogrammetry and Remote Sensing. Oct. 1, 2017;132:170-84. (Year: 2017).*

M. Lienou, H. Maitre and M. Datcu, "Semantic Annotation of Satellite Images Using Latent Dirichlet Allocation," in IEEE Geoscience and Remote Sensing Letters, vol. 7, No. 1, pp. 28-32, Jan. 2010, doi: 10.1109/LGRS.2009.2023536. (Year: 2010).*

Qi X, Zhu P, Wang Y, Zhang L, Peng J, Wu M, Chen J, Zhao X, Zang N, Mathiopoulos PT. MLRSNet: A multi-label high spatial resolution remote sensing dataset for semantic scene understanding. ISPRS Journal of Photogrammetry and Remote Sensing. Nov. 1, 2020;169:337-50. (Year: 2020).*

Debidatta Dwibedi, Ishan Misra, and Martial Hebert. Cut, paste and learn: Surprisingly easy synthesis for instance detection. In Proceedings of the IEEE International Conference on Computer Vision, pp. 1301-1310, 2017.

Kaiwen Duan, Song Bai, Lingxi Xie, Honggang Qi, Qing-ming Huang, and Qi Tian. Centernet: Object detection with keypoint triplets. arXiv preprint arXiv:1904.08189, 2019.

Hei Law and Jia Deng. Cornernet: Detecting objects as paired keypoints. In Proceedings of the European Conference on Computer Vision (ECCV), pp. 734-750, 2018.

Jiaqi Wang, Kai Chen, Shuo Yang, Chen Change Loy, and Dahua Lin. Region proposal by guided anchoring. In Proceedings of the IEEE Conference on Computer Vision and Pattern Recognition, pp. 2965-2974, 2019.

* cited by examiner

SEMANTICALLY-CONSISTENT AUGMENTED TRAINING DATA FOR TRAFFIC LIGHT DETECTION

FIELD

The disclosure relates generally to data augmentation for training object detection models. More specifically, the disclosure relates to data augmentation for training traffic light detection models in autonomous driving applications.

BACKGROUND

Roadway scene understanding is important in autonomous driving applications. Traffic light detection plays an important role in roadway scene understanding. However, detecting traffic lights in image data is challenging because traffic lights are generally small in size, located far away from the detector, and have very low contrast compared to their surroundings.

SUMMARY

Deep neural networks are used for detecting traffic lights in image data. Deep neural networks require large amounts of labeled training data to avoid overfitting. However, it is generally difficult to obtain large amounts of labeled training data. Data augmentation is used to overcome the scarcity of labeled training data. Thus, the disclosure provides, among other things, methods, systems, and non-transitory computer-readable media for generating augmented data to train a deep neural network to detect traffic lights in image data.

The disclosure provides a method for generating augmented data to train a deep neural network to detect traffic lights in image data. The method includes step (a) of receiving a plurality of real roadway scene images. The method also includes step (b) of selecting a subset of real roadway scene images from the plurality of real roadway scene images. The method further includes step (c) of selecting a real roadway scene image from the subset of real roadway scene images. The method also includes step (d) of determining a distribution indicting how likely each location in the selected real roadway scene image can contain a traffic light. The method further includes step (e) of selecting a location in the selected real roadway scene image by sampling the distribution. The method further includes step (f) of superimposing a traffic light image onto the selected real roadway scene image at the selected location to generate an augmented roadway scene image. The method also includes step (g) of repeating the steps (b) through (f) for each real roadway scene image in the subset of real roadway scene images to generate a plurality of augmented roadway scene images. The method further includes step (h) of training a pre-trained deep neural network model using the plurality of real roadway scene images and the plurality of augmented roadway scene images to generate a newly-trained deep neural network model.

The disclosure also provides a system for generating augmented data to train a deep neural network to detect traffic lights in image data. In one embodiment, the system includes an electronic processor and a memory. The memory stores computer-readable instructions that, when executed by the electronic processor, cause the electronic processor to perform operations. The operations include operation (a) of receiving a plurality of real roadway scene images. The operations also include operation (b) of selecting a subset of real roadway scene images from the plurality of real road- way scene images. The operations further include operation (c) of selecting a real roadway scene image from the subset of real roadway scene images. The operations also include operation (d) of determining a distribution indicting how likely each location in the selected real roadway scene image can contain a traffic light. The operations further include operation (e) of selecting a location in the selected real roadway scene image by sampling the distribution. The operations further also operation (f) of superimposing a traffic light image onto the selected real roadway scene image at the selected location to generate an augmented roadway scene image. The operations also further operation (g) of repeating the operations (b) through (f) for each real roadway scene image in the subset of real roadway scene images to generate a plurality of augmented roadway scene images. The operations also include operation (h) of training a pre-trained deep neural network model using the plurality of real roadway scene images and the plurality of augmented roadway scene images to generate a newly-trained deep neural network model.

The disclosure also provides a non-transitory computer-readable medium storing computer-readable instructions that, when executed by an electronic processor of a computer, cause the computer to perform operations. The operations include operation (a) of receiving a plurality of real roadway scene images. The operations also include operation (b) of selecting a subset of real roadway scene images from the plurality of real roadway scene images. The operations further include operation (c) of selecting a real roadway scene image from the subset of real roadway scene images. The operations also include operation (d) of determining a distribution indicting how likely each location in the selected real roadway scene image can contain a traffic light. The operations further include operation (e) of selecting a location in the selected real roadway scene image by sampling the distribution. The operations also include operation (f) of superimposing a traffic light image onto the selected real roadway scene image at the selected location to generate an augmented roadway scene image. The operations further include operation (g) of repeating the operations (b) through (f) for each real roadway scene image in the subset of real roadway scene images to generate a plurality of augmented roadway scene images. The operations also include operation (h) of training a pre-trained deep neural network model using the plurality of real roadway scene images and the plurality of augmented roadway scene images to generate a newly-trained deep neural network model.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments, and explain various principles and advantages of those embodiments.

Figure 1:
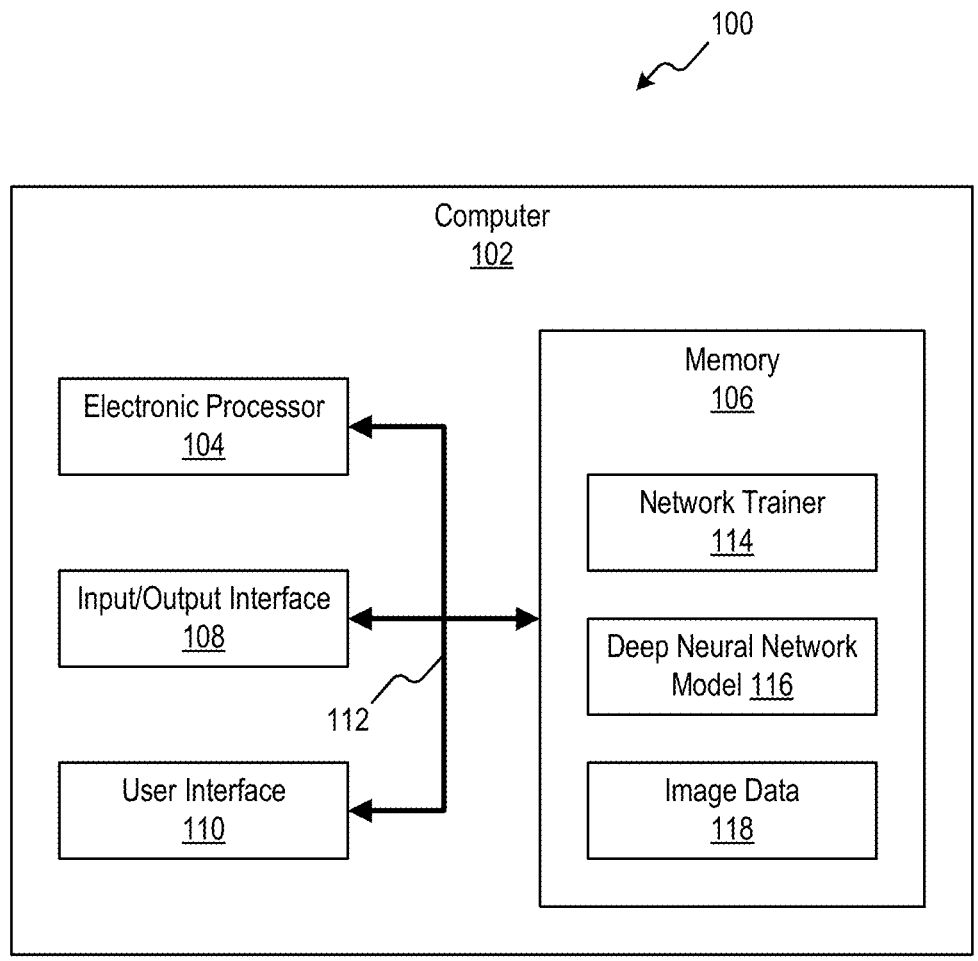
FIG. 1 is a block diagram of one example of a system for generating augmented data to train a deep neural network to detect traffic lights in image data, in accordance with some embodiments.

The system and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

FIG. 1 is a block diagram of one example of a system 100 for generated augmented data to train a deep neural network to detect traffic lights in image data. The system 100 illustrated in FIG. 1 includes a computer 102. The computer 102 illustrated in FIG. 1 includes an electronic processor 104 (for example, one or more microprocessors, application-specific integrated circuits (ASICs), systems-on-a-chip (SoCs), or other electronic controllers), memory 106, an input/output interface 108, a user interface 110, and a bus 112. In some implementations, the computer 102 includes fewer or additional components in configurations different from the one illustrated in FIG. 1. For example, in practice, the computer 102 may include additional components such as one or more power supplies, one or more sensors, and the like. For ease of explanation, these additional components are not illustrated here.

The input/output interface 108 includes routines for transferring information between components within the computer 102 and components external to the computer 102. The input/output interface 108 is configured to transmit and receive data via one or more wired couplings (for example, wires, optical fiber, and the like), wirelessly, or a combination thereof.

The user interface 110 includes, for example, one or more input mechanisms (for example, a touch screen, a keypad, a button, a knob, and the like), one or more output mechanisms (for example, a display, a printer, a speaker, and the like), or a combination thereof. In some implementations, the user interface 110 includes a touch-sensitive interface (for example, a touch-screen display) that displays visual output generated by software applications executed by the electronic processor 104. Visual output includes, for example, graphical indicators, lights, colors, text, images, graphical user interfaces (GUIs), combinations of the foregoing, and the like. The touch-sensitive interface also receives user input using detected physical contact (for example, detected capacitance or resistance). In some implementations, the user interface 110 is separated from the computer 102.

The bus 112 connects various components of the computer 102 including, for example, the memory 106 to the electronic processor 104. The memory 106 includes, for example, read only memory (ROM), random access memory (RAM), an electrically erasable programmable read-only memory (EEPROM), other non-transitory computer-readable media, or a combination thereof. In some implementations, the memory 106 is included in the electronic processor 104. The electronic processor 104 is configured to retrieve computer-readable instructions and data from the memory 106 and execute the computer-readable instructions to perform the functionality described herein. The memory 106 illustrated in FIG. 1 includes a network trainer 114, a deep neural network model 116, and image data 118.

The network trainer 114 includes computer-readable instructions that cause the electronic processor 104 to perform, among other things, the methods described herein. For example, the network trainer 114 includes computer-readable instructions that cause the electronic processor 104 to generate augmented training data and train the deep neural network model 116 to detect traffic lights in the image data 118 stored in the memory 106 (and other image data).

The image data 118 includes, for example, real roadway scene images. Real roadway scene images are images taken from the perspectives of vehicles traveling along roads. For example, the real roadway scene images may include images captured by a camera coupled to a vehicle while the vehicle travels along a road. In some implementations, each of the real roadway scene images includes at least one traffic light. In other implementations, some of the real roadway scene images do not include a traffic light.

As described above, data augmentation is used to overcome the scarcity of labeled training data. For example, traffic light images are superimposed onto real roadway scene images to generate augmented roadway scene images. The level of realism of augmented roadway scene images used to train a deep neural network affects the detection precision of the deep neural network. Semantic consistency increases the level of realism of augmented training images. In particular, semantic consistency increases the level of realism of augmented training images of structured scenes like roadway scene images.

In some implementations, augmented roadway scene images are generated based on the semantics of a roadway scene. For example, a Generative Adversarial Network (GAN) model is used to determine a distribution of how likely a location can contain a traffic light based solely on the semantics of a roadway scene. A GAN is a class of machine learning systems in which two neural networks contest each other in a game. For example, one neural network generates augmented roadway scene images that appear authentic and the second neural network evaluates the augmented roadway scene images for authenticity. The GAN model is trained to understand the semantics of roadway scenes and determine how likely any location can contain a traffic light. To understand the semantics of roadway scenes, in some implementations, the GAN model is trained using inpainted images where a traffic light is removed from a real roadway scene image and the GAN model determines the existence of the removed traffic light using the original ground truth of the original image.

Figure 2:
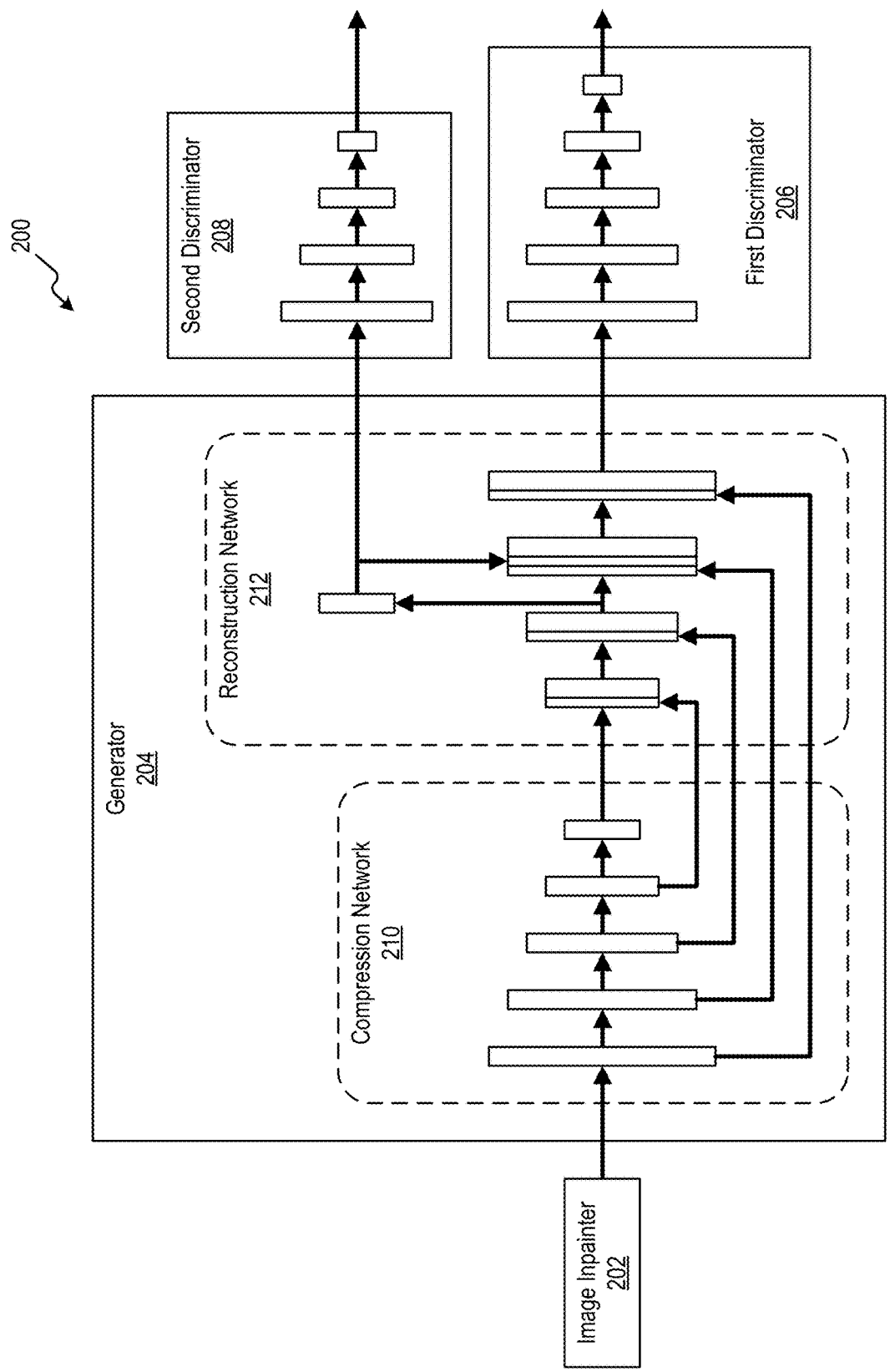
FIG. 2 is a block diagram of one example of a Generative Adversarial Network (GAN) model for generating augmented training data, in accordance with some embodiments.

FIG. 2 is a block diagram of one example of a GAN model 200 for generating augmented training data. The GAN model 200 illustrated in FIG. 2 includes an image inpainter 202, a generator 204, a first discriminator 206, and a second discriminator 208. In some implementations, the GAN model 200 includes fewer or additional components in configurations different from the one illustrated in FIG. 2. For example, the GAN model 200 may include more than one generator and more or less than two discriminators. Also, in practice, the GAN model 200 may include additional components such as one or more feedback networks, one or more backpropagation networks, one or more encoders, one or more decoders, and the like. For ease of explanation, these additional components are not illustrated here.

The image inpainter 202 is configured to receive a real roadway scene image and remove one or more traffic lights included therein to generate an inpainted image with the one or more traffic lights removed. In some implementations, the image inpainter 202 sets every pixel in the real roadway scene image that contains a traffic light to a predetermined value (for example, zero). The inpainted image is input into the generator 204. The generator 204 illustrated in FIG. 2 includes a compression network 210 and a reconstruction network 212. The compression network 210 is configured to compress the content of the inpainted image into a smaller amount of content. The smaller amount of content that the compression network 210 outputs is the most meaningful content of the inpainted image and represents an understanding of key connections between the positioning of traffic lights and their surroundings. The reconstruction network 212 is configured to reconstruct the original image starting with the most meaningful content that is output by the compression network 210. For example, the reconstruction network 212 using the most meaningful content to select a location to add a traffic light that is likely to be semantically-consistent with the roadway scene. The first discriminator 206 and the second discriminator 208 are configured to compare reconstructed images generated by the generator 204 to the original image to determine whether the reconstructed images are realistic or unrealistic. The first discriminator 206 and the second discriminator 208 compare different scales of reconstructed images. For example, the first discriminator 206 determines whether the final reconstructed image generated by the generator 204 is realistic or unrealistic. Further, the second discriminator 208 determines whether an earlier stage of the reconstructed image generated by the generator 204 is realistic or unrealistic. Based on the determinations of the first discriminator 206 and the second discriminator 208, the generator 204 is configured to adjust parameters within the compression network 210 and the reconstruction network 212 used to determine locations to add traffic lights that are likely to be semantically-consistent with the roadway scene.

After numerous iterations of the training described above, the generator 204 is configured to consistently generate reconstructed images which are determined to be authentic by the first discriminator 206, the second discriminator 208, or both. As a result of the training, the GAN model 200 determines a distribution of how likely any location in a real roadway scene image can contain a traffic light based on the semantics of the roadway scene. The determined distribution is used to generate augmented roadway scene images that are semantically-consistent with the roadway scene, as will be described in more detail below. In addition, the determined distribution includes anchor centers for sampling to detect small and occluded traffic lights.

Figure 3A:
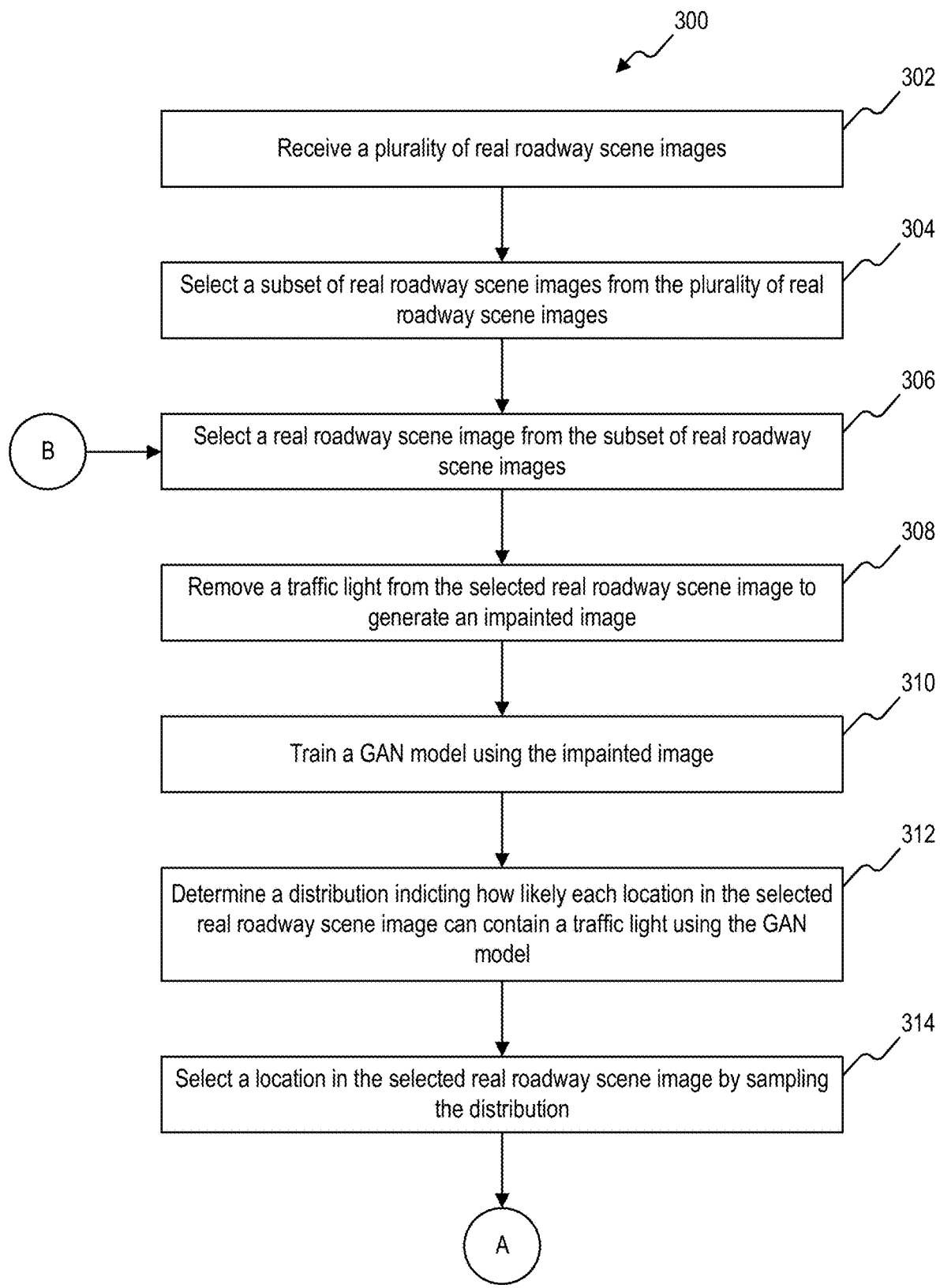
FIGS. 3A and 3B are flow diagrams of one example of a method for generating augmented training data using a GAN, in accordance with some embodiments.
Figure 3B:
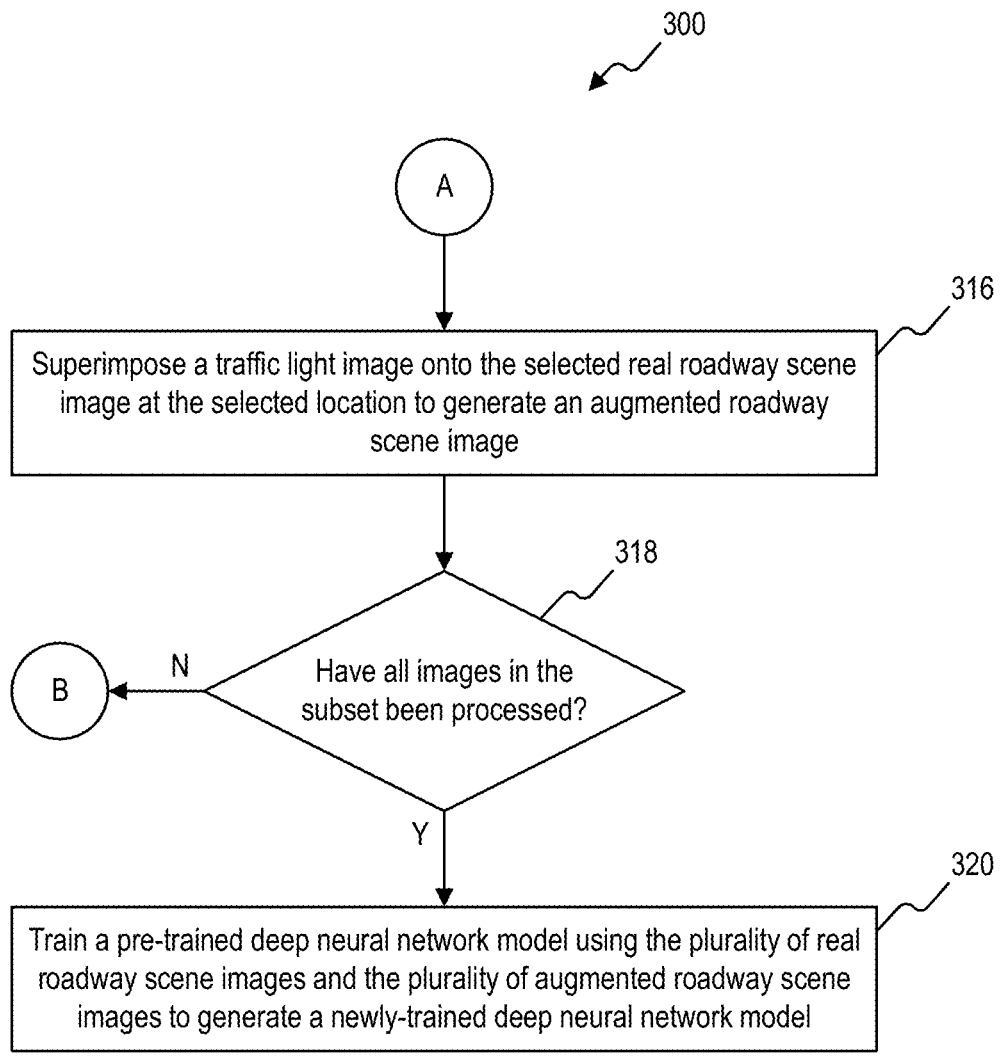

FIGS. 3A and 3B are flow diagrams of one example of a method 300 for generating augmented training data using a GAN (for example, using the GAN model 200). In some implementations, the network trainer 114 includes computer-readable instructions that cause the electronic processor 104 to perform all (or any combination) of the blocks of method 300 described below. At block 302, a plurality of real roadway scene images are received (for example, by the electronic processor 104). In some implementations, all (or any portion) of the plurality of real roadway scene images are stored in the memory 106. For example, the plurality of real roadway scene images may be included in image data 118, which is stored in the memory 106. Alternatively, or in addition, the computer 102 receives all (or any portion) of the plurality of real roadway scene images from an external source via the input/output interface 108. For example, the computer 102 may receive the plurality of real roadway scene images from a separate computer, a server, a database, and the like.

At block 304, a subset of real roadway scene images is selected from the plurality of real roadway scene images (for example, by the electronic processor 104). The subset includes any portion of the plurality of real roadway scene images. For example, the subset may include less than the entire plurality of real roadway scene images or the entire plurality of real roadway scene images. In some implementations, the quantity of images selected to be included in the subset is determined based on a predetermined percentage of the total quantity of images included in the plurality of real roadway scene images. For example, the subset may include half of the total quantity of images included in the plurality of real roadway scene images. In some implementations, the quantity of images selected to be included in the subset is determined based on a predetermined quantity. As a first example, the subset includes 500 images when the predetermined quantity is 500 images and the plurality of real roadway scene images includes more than 500 images. As a second example, the subset includes the entire plurality of real roadway scene images when the predetermined quantity is 500 images and the plurality of real roadway scene images includes 500 images or less than 500 images.

At block 306, a real roadway scene image is selected from the subset of real roadway scene images. For example, the electronic processor 104 selects a first image include in the subset of real roadway scene images. At block 308, a traffic light is moved from the selected real roadway scene image to generate an inpainted image. For example, the image inpainter 202 removes a traffic lights from the selected real roadway scene image to generate the inpainted image. In some implementations, the image inpainter 202 sets every pixel in the selected real roadway scene image that contains a traffic light to a predetermined value (for example, zero). At block 310, a GAN model is trained using the inpainted image. For example, a GAN model is trained from scratch using the inpainted image as described above in relation to FIG. 2.

At block 312, a distribution indicating how likely each location in the selected real roadway scene image can contain a traffic light is determined using the GAN model. For example, the electronic processor 104 determines a distribution using the GAN model 200 described above in relation to FIG. 2. At block 314, a location in the selected real roadway scene image is selected by sampling the distribution. For example, the electronic processor 104 samples the distribution to select a location with a high likelihood of containing a traffic light. Turning to FIG. 3B, at block 316, a traffic light image is superimposed onto the selected real roadway scene image at the selected location to generate an augmented roadway scene image.

At block 318, the electronic processor 104 determines whether every image in the subset of real roadway scene images has been processed, for example, to generate augmented images. When not all of the subset of real roadway scene images have been processed, the method 300 returns to block 306 in FIG. 3A to select another one of the subset of real roadway scene images. Alternatively, when every image in the subset of real roadway scene images has been processed, a plurality of augmented roadway scene images have been generated and the method 300 proceeds to block 320. At block 320, a pre-trained deep neural network model is trained using the plurality of real roadway scene images and the plurality of augmented roadway scene images to generate a newly-trained deep neural network model. For example, the deep neural network model 116 stored in the memory 106 is trained to detect traffic lights in image data using the plurality of real roadway scene images and the plurality of augmented roadway scene images. In some implementations, the pre-trained deep neural network model is an untrained deep neural network model. In other implementations, the pre-trained deep neural network model has been previously trained, for example, with image data that is not included in the plurality of real roadway scene images.

Figure 4A:
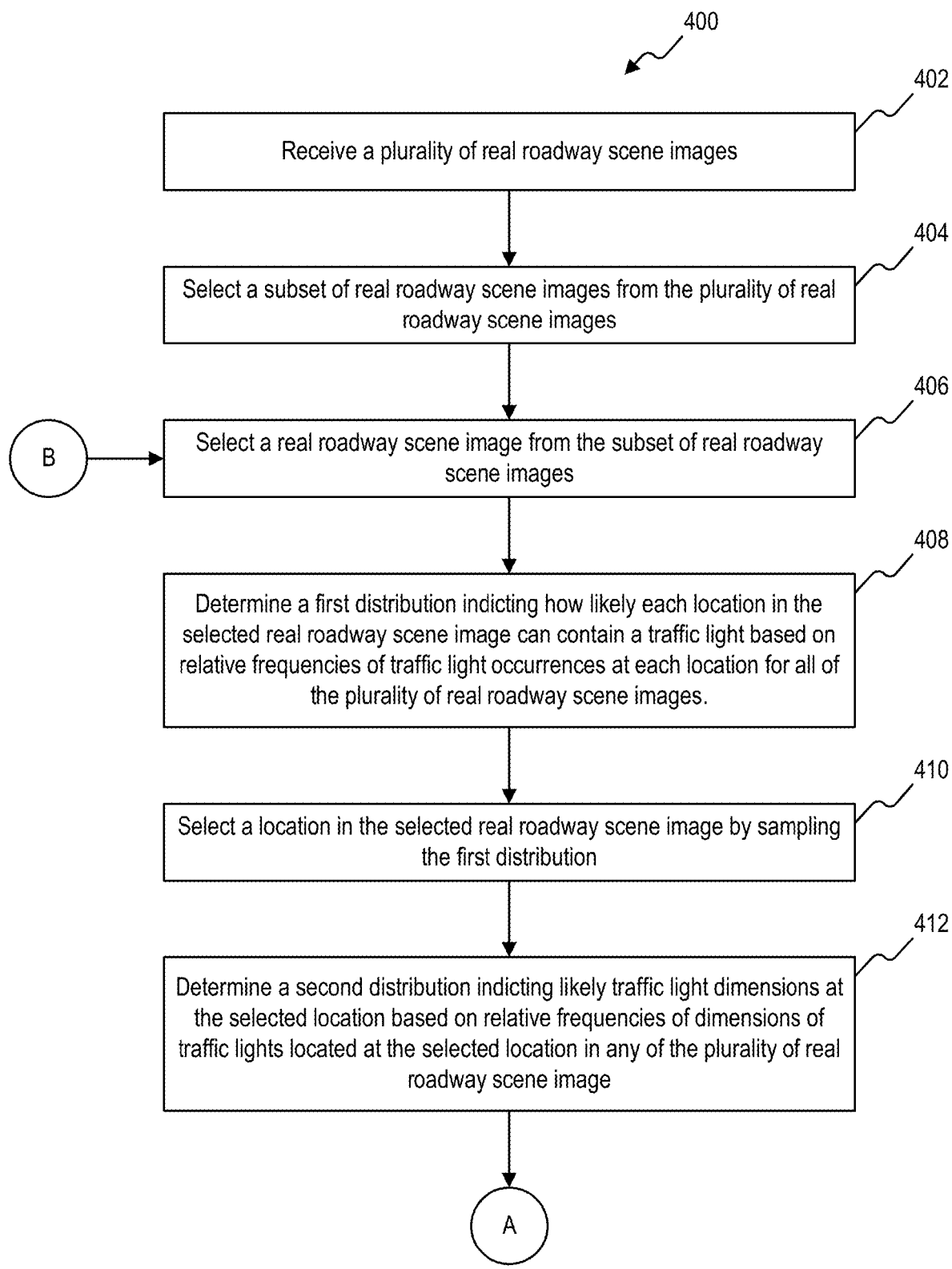
FIGS. 4A and 4B are flow diagrams of one example of a method for generating augmented training data using prior knowledge, in accordance with some embodiments.
Figure 4B:
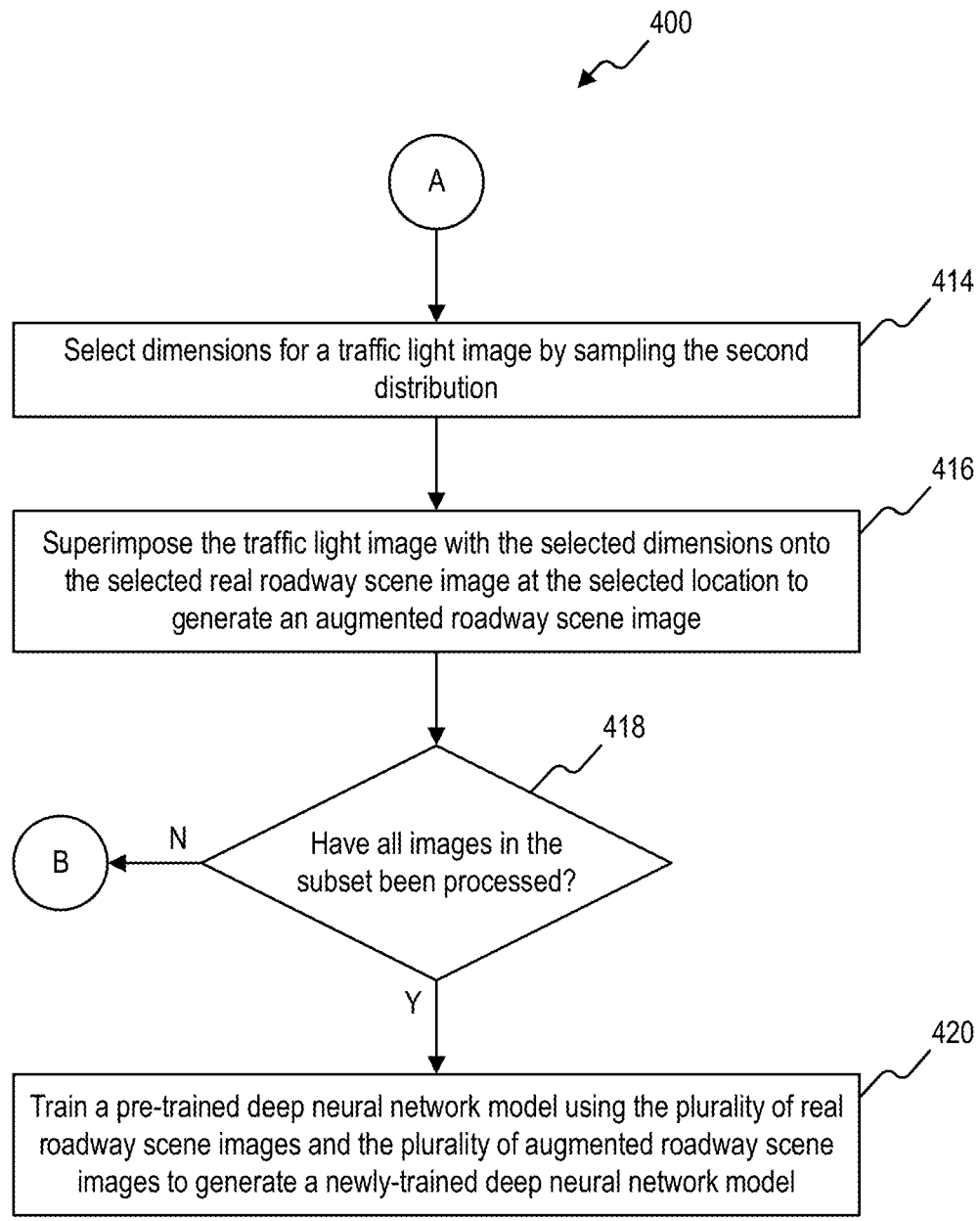

In some implementations, augmented roadway scene images are generated based on global semantics for every image in a dataset. For example, augmented roadway scene images are generated using prior knowledge of traffic light placement that is empirically estimated from a plurality of real image roadway scene images. FIGS. 4A and 4B are flow diagrams of one example of a method 400 for generating augmented training data using prior knowledge. In some implementations, the network trainer 114 includes computer-readable instructions that cause the electronic processor 104 to perform all (or any combination) of the blocks of method 400 described below. At block 402, a plurality of real roadway scene images are received. For example, the electronic processor 104 receives a plurality of real roadway scene images as described above in relation to block 302 in FIG. 3A. At block 404, a subset of real roadway scene images is selected from the plurality of real roadway scene images. For example, the electronic processor 104 selects the subset of real roadway scene images from the plurality of real roadway scene images as described above in relation to block 304 in FIG. 3A. At block 406, a real roadway scene image is selected from the subset of real roadway scene images. For example, the electronic processor 104 selects a first image include in the subset of real roadway scene images.

At block 408, a first distribution indicating how likely each location in the selected real roadway scene can contain a traffic light is determined based on relative frequencies of traffic light occurrences at each location for all of the plurality of real roadway scene images. For example, when the plurality of real roadway scene images includes 497 images, the first distribution may indicate, among other things, that 329 images include a traffic light at a first location and 53 images include a traffic light at a second location that is different from the first location. At block 410, a location in the selected real roadway scene image is selected by sampling the first distribution. For example, the electronic processor 104 samples the first distribution to select a location with a high likelihood of containing a traffic light.

At block 412, a second distribution indicating likely traffic light dimensions at the selected location is determined based on relative frequencies of dimensions of traffic lights located at the selected location in any of the plurality of real roadway scene images. For example, when the plurality of real roadway scene images includes 497 images and 329 images include a traffic light at the selected location, the second distribution may indicate that 211 traffic lights located at selected location have a first set of dimensions. The second distribution may also indicate that 99 traffic lights located at selected location have a second set of dimensions that are different from the first set of dimensions. The second distribution may also indicate that 19 traffic lights located at selected location have a third set of dimensions that are different from the first set of dimensions and the second set of dimensions. Traffic light dimensions include height, width, or both. Turning to FIG. 4B, at block 414, dimensions for a traffic light image to superimpose onto the selected real roadway scene image are selected by sampling the second distribution. For example, the electronic processor 104 samples the second distribution to select the most common height and width for traffic lights in the plurality of real roadway scene images.

At block 416, a traffic light image with the selected dimensions is superimposed onto the selected real roadway scene image at the selected location to generate an augmented roadway scene image. At block 418, the electronic processor 104 determine whether every image in the subset of real roadway scene images has been processed, for example, to generate augmented images. When not all of the subset of real roadway scene images have been processed, the method 400 returns to block 406 in FIG. 4A to select another one of the subset of real roadway scene images. Alternatively, when every image in the subset of real roadway scene images has been processed, a plurality of augmented roadway scene images have been generated and the method 400 proceeds to block 420. At block 420, a pre-trained deep neural network model is trained using the plurality of real roadway scene images and the plurality of augmented roadway scene images to generate a newly-trained deep neural network model. For example, the deep neural network model 116 stored in the memory 106 is trained to detect traffic lights in image data using the plurality of real roadway scene images and the plurality of augmented roadway scene images.

In some implementations, the method 400 further includes filtering each of the plurality of augmented roadway scene images with a Poisson blending. In some implementations each of the plurality of augmented roadway scene images are filtered with the Poisson blending prior to training the pre-trained deep neural network model. In some implementations, the method 400 does not include blocks 412 and 414 and the method 400 proceeds to block 416 after block 410. For example, in some implementations, the dimensions for the superimposed traffic light image are predetermined values.

Figure 5:
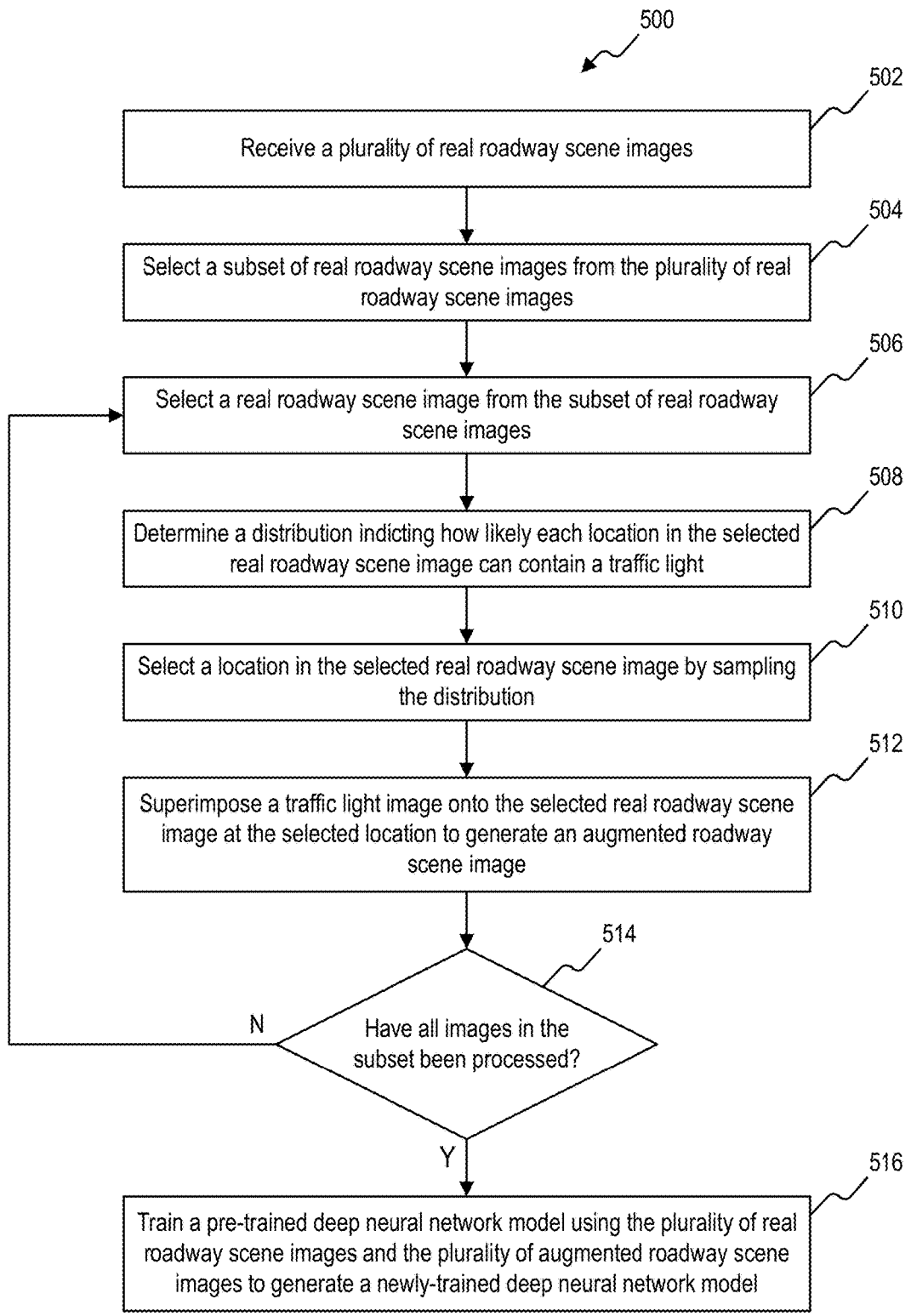
FIG. 5 is a flow diagram of one example of a method for generating augmented data to train a deep neural network to detect traffic lights in image data, in accordance with some embodiments.

FIG. 5 is a flow diagram of one example of a method 500 for generating augmented data to train a deep neural network to detect traffic lights in image data. In some implementations, the network trainer 114 includes computer-readable instructions that cause the electronic processor 104 to perform all (or any combination) of the blocks of method 500 described below. At block 502, a plurality of real roadway scene images are received. For example, the electronic processor 104 receives a plurality of real roadway scene images as described above in relation to block 302 in FIG. 3A. At block 504, a subset of real roadway scene images is selected from the plurality of real roadway scene images. For example, the electronic processor 104 selects the subset of real roadway scene images from the plurality of real roadway scene images as described above in relation to block 304 in FIG. 3A. At block 506, a real roadway scene image is selected from the subset of real roadway scene images. For example, the electronic processor 104 selects a first image include in the subset of real roadway scene images. At block 508, a distribution indicating how likely each location in the selected real roadway scene can contain a traffic light is determined (for example, by the electronic processor 104). In some implementations, the distribution is determined using a GAN, for example, as described above in relation to block 312 in FIG. 3A. In other implementations, the distribution is determined based on relative frequencies of traffic light occurrences at each location for all of the plurality of real roadway scene images, for example, as described above in relation to block 408 in FIG. 4A. At block 510, a location in the selected real roadway scene image is selected by sampling the distribution. For example, the electronic processor 104 samples the distribution to select a location with a high likelihood of containing a traffic light. At block 514, a traffic light image is superimposed onto the selected real roadway scene image at the selected location to generate an augmented roadway scene image. At block 514, the electronic processor 104 determine whether every image in the subset of real roadway scene images has been processed, for example, to generate augmented images. When not all of the subset of real roadway scene images have been processed, the method 500 returns to block 506 to select another one of the subset of real roadway scene images. Alternatively, when every image in the subset of real roadway scene images has been processed, a plurality of augmented roadway scene images have been generated and the method 500 proceeds to block 516. At block 516, a pre-trained deep neural network model is trained using the plurality of real roadway scene images and the plurality of augmented roadway scene images to generate a newly-trained deep neural network model. For example, the deep neural network model 116 stored in the memory 106 is trained to detect traffic lights in image data using the plurality of real roadway scene images and the plurality of augmented roadway scene images.

Figure 6:
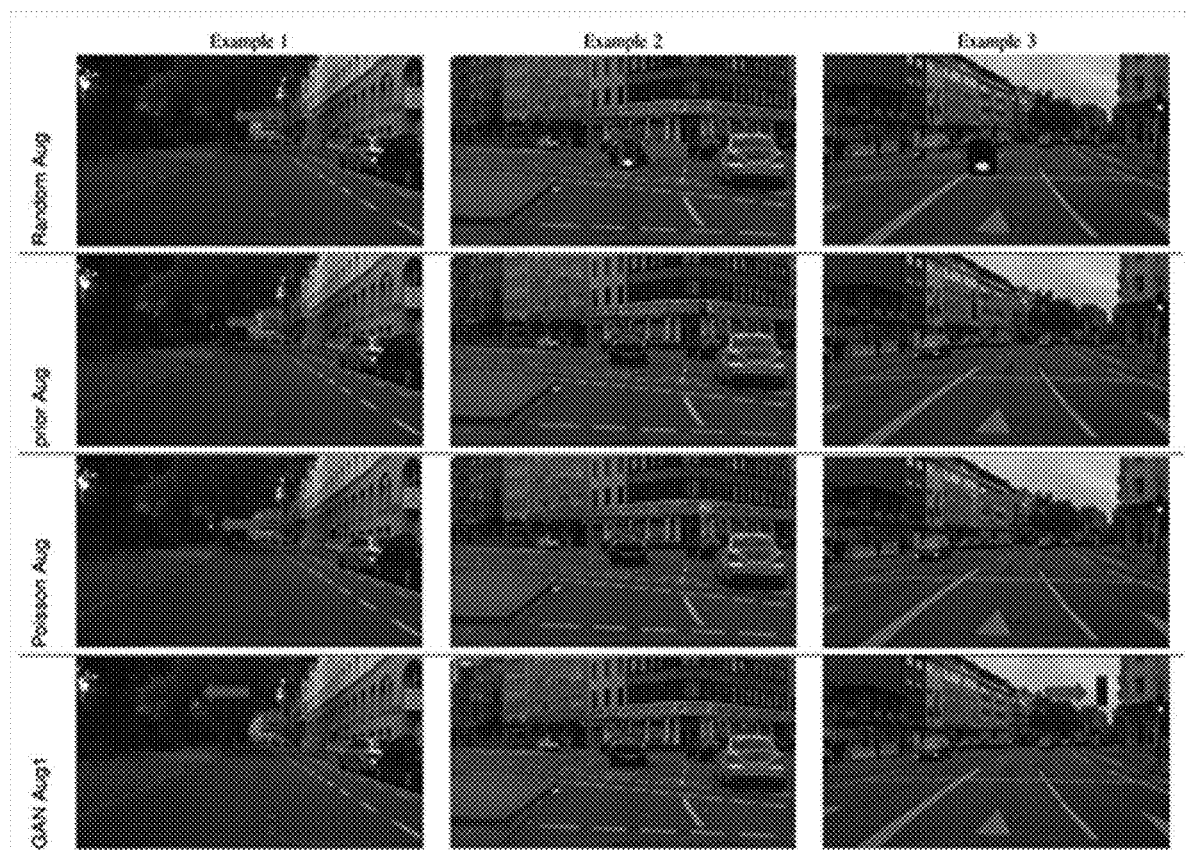
FIG. 6 are examples of augmented roadway scene images generated using different data augmentation techniques, in accordance with some embodiments.

FIG. 6 includes examples of augmented roadway scene images generating using different augmentation techniques. The images in the column labeled "Random Aug" are examples of augmented images generated by inserting traffic light images in random locations with random width and height configurations. The images in the column labeled "prior Aug" are examples of augmented images generated using prior knowledge, for example, as described above in relation to the method 400. The images in the column labeled "Poisson Aug" are examples of augmented images generated by filtering the images in the "prior Aug" column with a Poisson blending. The images in the column labeled "GAN Aug1" are examples of augmented images generated using a GAN, for example, as described above in relation to the method 300.

Figure 7:
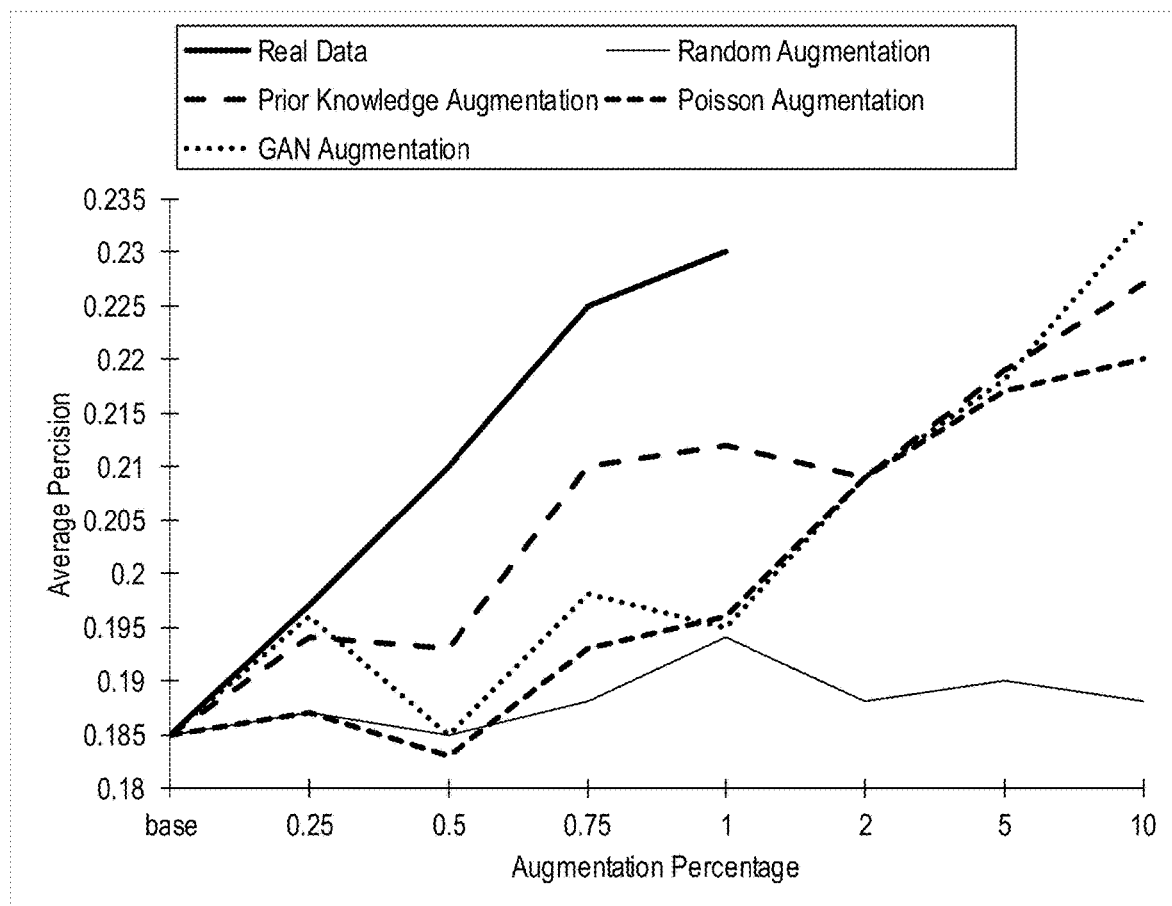
FIG. 7 is a graph of example average precision values for different data augmentation techniques, in accordance with some embodiments.

FIG. 7 is a graph of examples of the average precisions in detecting traffic lights for deep neural network models trained with training data having different degrees of realism. The "Real Data" line in the graph represents average precisions when a deep neural network model is trained using 500 or more real roadway scene images. The "Random Augmentation" line in the graph represents average precisions when a deep neural network model is trained using 500 real roadway scene images and different quantities of augmented roadway scene images generated by inserting traffic light images in random locations with random width and height configurations. The "Prior Knowledge" line in the graph represents average precisions when a deep neural network model is trained using 500 real roadway scene images and different quantities of augmented roadway scene images generated using prior knowledge, for example, as described above in relation to the method 400. The "Poisson Augmentation" line in the graph represents average precisions when a deep neural network model is trained using 500 real roadway scene images and different quantities of augmented roadway scene images generated using prior knowledge and Poisson filtering. For example, the augmented roadway scene images are generated using the method 400 described above with the additional step of filtering each of the plurality of augmented roadway scene images with a Poisson blending prior to training the deep neural network model. The "GAN Augmentation" line in the graph represents average precisions when a deep neural network model is trained using 500 real roadway scene images and different quantities of augmented roadway scene images generated using a GAN, for example, as described above in relation to the method 300.

The horizontal axis of the graph in FIG. 7 indicates the total quantity of training images used to train the deep neural network model. The "base" label on the horizontal axis represents when the deep neural network model is trained using 500 real roadway scene images. For the "Real Data" line, the "0.25" label on the horizontal axis represents training the deep neural network model using 625 real roadway scene images. For the other lines, the "0.25" label on the horizontal axis represents training the deep neural network model using 500 real roadway scene images and 125 augmented roadway scene images generated using the respective data augmentation techniques described above. For the "Real Data" line, the "1" label on the horizontal axis represents training the deep neural network model using 1,000 real roadway scene images. For the other lines, the "1" label on the horizontal axis represents training the deep neural network model using 500 real roadway scene images and 500 augmented roadway scene images generated using the respective data augmentation techniques described above. For the "Real Data" line, the "10" label on the horizontal axis represents training the deep neural network model using 5,500 real roadway scene images. For the other lines, the "10" label on the horizontal axis represents training the deep neural network model using 500 real roadway scene images and 5,000 augmented roadway scene images generated using the respective data augmentation techniques described above.

The graph in FIG. 7 illustrates that prior knowledge augmentation and Poisson augmentation both achieve similar performance improvements of traffic light detection as compared to using additional real data. The graph in FIG. 7 also illustrates that GAN augmentation achieves similar or higher performance improvements of traffic light detection as compared to using additional real data. The graph in FIG. 7 further illustrates that prior knowledge augmentation, Poisson augmentation, and GAN augmentation require larger quantities to achieve similar performance improvements as using additional real data. However, obtaining additional real data is much more logistically difficult than generating more augmented data using the augmentation techniques described herein. The graph is FIG. 7 also illustrates that random augmentation, which is not semantically-consistent, does not achieve a significant performance improvement of traffic light detection.

Table 1 illustrates a comparison of the sampling efficiencies of prior knowledge augmentation and GAN augmentation in detecting traffic lights that are not detected by other models.

TABLE 1

| | SAMPLING EFFICIENCY COMPARISON | | | | | |
| --- | --- | --- | --- | --- | --- | --- |
| | 50 Samples | 100 Samples | 300 Samples | 500 Samples | 1,000 Samples | 2,000 Samples |
| Prior Knowledge Augmentation | 0.128 | 0.187 | 0.216 | 0.228 | 0.241 | 0.252 |
| GAN Augmentation | 0.196 | 0.3 | 0.52 | 0.571 | 0.588 | 0.594 |

Various aspects of the disclosure may take any one or more of the following exemplary configurations.

EEE(1) A method for generating augmented data to train a deep neural network to detect traffic lights in image data, the method comprising the steps of: (a) receiving a plurality of real roadway scene images; (b) selecting a subset of real roadway scene images from the plurality of real roadway scene images; (c) selecting a real roadway scene image from the subset of real roadway scene images; (d) determining a distribution indicting how likely each location in the selected real roadway scene image can contain a traffic light; (e) selecting a location in the selected real roadway scene image by sampling the distribution; (f) superimposing a traffic light image onto the selected real roadway scene image at the selected location to generate an augmented roadway scene image; (g) repeating the steps (b) through (f) for each real roadway scene image in the subset of real roadway scene images to generate a plurality of augmented roadway scene images; and (h) training a pre-trained deep neural network model using the plurality of real roadway scene images and the plurality of augmented roadway scene images to generate a newly-trained deep neural network model.

EEE(2) The method of EEE(1), wherein the step (d) includes: removing a traffic light from the selected real roadway scene image to generate an inpainted image, training a Generative Adversarial Network (GAN) model using the inpainted image, and determining the distribution using the GAN model.

EEE(3) The method of EEE(1) or EEE(2), wherein the step (d) includes determining the distribution based on relative frequencies of traffic light occurrences at each location for all of the plurality of real roadway scene images.

EEE(4) The method of any one of EEE(1) to EEE(3), further comprising the step of filtering each of the plurality of augmented roadway scene images with a Poisson blending.

EEE(5) The method of EEE(4), wherein each of the plurality of augmented roadway scene images are filtered with the Poisson blending prior to training the pre-trained deep neural network model.

EEE(6) The method of any one of EEE(1) of EEE(5), wherein the distribution is a first distribution, and wherein the step (f) includes: determining a second distribution indicating likely traffic light dimensions at the selected location based on relative frequencies of dimensions of traffic lights located at the selected location in any of the plurality of real roadway scene images, selecting dimensions for the traffic light image by sampling the second distribution, and superimposing the traffic light image onto the selected real roadway scene image at the selected location to generate the augmented roadway scene image, wherein the traffic light image includes the selected dimensions.

EEE(7) The method of EEE(6), wherein the selected dimensions include a height of the traffic light image and a width of the traffic light image.

EEE(8) A system for generating augmented data to train a deep neural network to detect traffic lights in image data, the system comprising: an electronic processor; and a memory storing computer-readable instructions that, when executed by the electronic processor, cause the electronic processor to perform operations including: (a) receiving a plurality of real roadway scene images, (b) selecting a subset of real roadway scene images from the plurality of real roadway scene images, (c) selecting a real roadway scene image from the subset of real roadway scene images, (d) determining a distribution indicting how likely each location in the selected real roadway scene image can contain a traffic light, (e) selecting a location in the selected real roadway scene image by sampling the distribution, (f) superimposing a traffic light image onto the selected real roadway scene image at the selected location to generate an augmented roadway scene image, (g) repeating the operations (b) through (f) for each real roadway scene image in the subset of real roadway scene images to generate a plurality of augmented roadway scene images, and (h) training a pre-trained deep neural network model using the plurality of real roadway scene images and the plurality of augmented roadway scene images to generate a newly-trained deep neural network model.

EEE(9) The system of EEE(8), wherein the operation (d) includes: removing a traffic light from the selected real roadway scene image to generate an inpainted image, training a Generative Adversarial Network (GAN) model using the inpainted image, and determining the distribution using the GAN model.

EEE(10) The system of EEE(8) or EEE(9), wherein the operation (d) includes determining the distribution based on relative frequencies of traffic light occurrences at each location for all of the plurality of real roadway scene images.

EEE(11) The system of any one of EEE(8) to EEE(10), wherein the operations further comprising filtering each of the plurality of augmented roadway scene images with a Poisson blending.

EEE(12) The system of EEE(11), wherein each of the plurality of augmented roadway scene images are filtered with the Poisson blending prior to training the pre-trained deep neural network model.

EEE(13) The system of any one of EEE(8) to EEE(12), wherein the distribution is a first distribution, and wherein the operation (f) includes: determining a second distribution indicting likely traffic light dimensions at the selected location based on relative frequencies of dimensions of traffic lights located at the selected location in any of the plurality of real roadway scene images, selecting dimensions for the traffic light image by sampling the second distribution, and superimposing the traffic light image onto the selected real roadway scene image at the selected location to generate the augmented roadway scene image, wherein the traffic light image includes the selected dimensions.

EEE(14) The system of EEE(13), wherein the selected dimensions include a height of the traffic light image and a width of the traffic light image.

EEE(15) A non-transitory computer-readable medium storing computer-readable instructions that, when executed by an electronic processor of a computer, cause the computer to perform operations comprising: (a) receiving a plurality of real roadway scene images; (b) selecting a subset of real roadway scene images from the plurality of real roadway scene images; (c) selecting a real roadway scene image from the subset of real roadway scene images; (d) determining a distribution indicting how likely each location in the selected real roadway scene image can contain a traffic light; (e) selecting a location in the selected real roadway scene image by sampling the distribution; (f) superimposing a traffic light image onto the selected real roadway scene image at the selected location to generate an augmented roadway scene image; (g) repeating the operations (b) through (f) for each real roadway scene image in the subset of real roadway scene images to generate a plurality of augmented roadway scene images; and (h) training a pre-trained deep neural network model using the plurality of real roadway scene images and the plurality of augmented roadway scene images to generate a newly-trained deep neural network model.

EEE(16) The non-transitory computer-readable medium of EEE(15), wherein the operation (d) includes: removing a traffic light from the selected roadway scene image to generate an inpainted image, training a Generative Adversarial Network (GAN) model using the inpainted image, and determining the distribution based on the GAN model.

EEE(17) The non-transitory computer-readable medium of EEE(15) or EEE(16), wherein the operation (d) includes determining the distribution based on relative frequencies of traffic light occurrences at each location for all of the plurality of real roadway scene images.

EEE(18) The non-transitory computer-readable medium of any one of EEE(15) to EEE(17), wherein the operations further comprising filtering each of the plurality of augmented roadway scene images with a Poisson blending.

EEE(19) The non-transitory computer-readable medium of EEE(18), wherein each of the plurality of augmented roadway scene images are filtered with the Poisson blending prior to training the pre-trained deep neural network model.

EEE(20) The non-transitory computer-readable medium of any one of EEE(15) to EEE(19), wherein the distribution is a first distribution, and wherein the operation (f) includes: determining a second distribution indicting likely traffic light dimensions at the selected location based on relative frequencies of dimensions of traffic lights located at the selected location in any of the plurality of real roadway scene images, selecting dimensions for the traffic light image by sampling the second distribution, and superimposing the traffic light image onto the selected real roadway scene image at the selected location to generate the augmented roadway scene image, wherein the traffic light image includes the selected dimensions.

Thus, the disclosure provides, among other things, methods, systems, and non-transitory computer-readable media for generating augmented data to train a deep neural network to detect traffic lights in image data. Various features and advantages are set forth in the following claims.

Machine learning generally refers to the ability of a computer program to learn without being explicitly programmed. In some implementations, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of the approaches described above, a computer program can ingest, parse, and understand data and progressively refine algorithms for data analytics.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method for generating augmented data to train a deep neural network to detect traffic lights in image data, the method comprising the steps of:
 (a) receiving a plurality of real roadway scene images;
 (b) selecting a subset of real roadway scene images from the plurality of real roadway scene images;
 (c) selecting a real roadway scene image from the subset of real roadway scene images;
 (d) determining a distribution indicting how likely each location in the selected real roadway scene image can contain a traffic light;
 (e) selecting a location in the selected real roadway scene image by sampling the distribution;
 (f) superimposing a traffic light image onto the selected real roadway scene image at the selected location to generate an augmented roadway scene image;
 (g) repeating the steps (b) through (f) for each real roadway scene image in the subset of real roadway scene images to generate a plurality of augmented roadway scene images; and
 (h) training a pre-trained deep neural network model using the plurality of real roadway scene images and the plurality of augmented roadway scene images to generate a newly-trained deep neural network model.

2. The method of claim 1, wherein the step (d) includes:
 removing a traffic light from the selected real roadway scene image to generate an inpainted image,
 training a Generative Adversarial Network (GAN) model using the inpainted image, and
 determining the distribution using the GAN model.

3. The method of claim 1, wherein the step (d) includes determining the distribution based on relative frequencies of traffic light occurrences at each location for all of the plurality of real roadway scene images.

4. The method of claim 3, further comprising the step of filtering each of the plurality of augmented roadway scene images with a Poisson blending.

5. The method of claim 4, wherein each of the plurality of augmented roadway scene images are filtered with the Poisson blending prior to training the pre-trained deep neural network model.

6. The method of claim 3, wherein the distribution is a first distribution, and wherein the step (f) includes:
 determining a second distribution indicating likely traffic light dimensions at the selected location based on relative frequencies of dimensions of traffic lights located at the selected location in any of the plurality of real roadway scene images,
 selecting dimensions for the traffic light image by sampling the second distribution, and
 superimposing the traffic light image onto the selected real roadway scene image at the selected location to generate the augmented roadway scene image, wherein the traffic light image includes the selected dimensions.

7. The method of claim 6, wherein the selected dimensions include a height of the traffic light image and a width of the traffic light image.

8. A system for generating augmented data to train a deep neural network to detect traffic lights in image data, the system comprising:
 an electronic processor; and
 a memory storing computer-readable instructions that, when executed by the electronic processor, cause the electronic processor to perform operations including:
  (a) receiving a plurality of real roadway scene images,
  (b) selecting a subset of real roadway scene images from the plurality of real roadway scene images,
  (c) selecting a real roadway scene image from the subset of real roadway scene images,
  (d) determining a distribution indicting how likely each location in the selected real roadway scene image can contain a traffic light,
  (e) selecting a location in the selected real roadway scene image by sampling the distribution,
  (f) superimposing a traffic light image onto the selected real roadway scene image at the selected location to generate an augmented roadway scene image,
  (g) repeating the operations (b) through (f) for each real roadway scene image in the subset of real roadway scene images to generate a plurality of augmented roadway scene images, and
  (h) training a pre-trained deep neural network model using the plurality of real roadway scene images and the plurality of augmented roadway scene images to generate a newly-trained deep neural network model.

9. The system of claim 8, wherein the operation (d) includes:
 removing a traffic light from the selected real roadway scene image to generate an inpainted image,
 training a Generative Adversarial Network (GAN) model using the inpainted image, and
 determining the distribution using the GAN model.

10. The system of claim 8, wherein the operation (d) includes determining the distribution based on relative frequencies of traffic light occurrences at each location for all of the plurality of real roadway scene images.

11. The system of claim 10, wherein the operations further comprising filtering each of the plurality of augmented roadway scene images with a Poisson blending.

12. The system of claim 11, wherein each of the plurality of augmented roadway scene images are filtered with the Poisson blending prior to training the pre-trained deep neural network model.

13. The system of claim 10, wherein the distribution is a first distribution, and wherein the operation (f) includes:
 determining a second distribution indicting likely traffic light dimensions at the selected location based on relative frequencies of dimensions of traffic lights located at the selected location in any of the plurality of real roadway scene images,
 selecting dimensions for the traffic light image by sampling the second distribution, and
 superimposing the traffic light image onto the selected real roadway scene image at the selected location to generate the augmented roadway scene image, wherein the traffic light image includes the selected dimensions.

14. The system of claim 13, wherein the selected dimensions include a height of the traffic light image and a width of the traffic light image.

15. A non-transitory computer-readable medium storing computer-readable instructions that, when executed by an electronic processor of a computer, cause the computer to perform operations comprising:
(a) receiving a plurality of real roadway scene images;
(b) selecting a subset of real roadway scene images from the plurality of real roadway scene images;
(c) selecting a real roadway scene image from the subset of real roadway scene images;
(d) determining a distribution indicting how likely each location in the selected real roadway scene image can contain a traffic light;
(e) selecting a location in the selected real roadway scene image by sampling the distribution;
(f) superimposing a traffic light image onto the selected real roadway scene image at the selected location to generate an augmented roadway scene image;
(g) repeating the operations (b) through (f) for each real roadway scene image in the subset of real roadway scene images to generate a plurality of augmented roadway scene images; and
(h) training a pre-trained deep neural network model using the plurality of real roadway scene images and the plurality of augmented roadway scene images to generate a newly-trained deep neural network model.

16. The non-transitory computer-readable medium of claim 15, wherein the operation (d) includes:
removing a traffic light from the selected roadway scene image to generate an inpainted image,
training a Generative Adversarial Network (GAN) model using the inpainted image, and
determining the distribution based on the GAN model.

17. The non-transitory computer-readable medium of claim 15, wherein the operation (d) includes determining the distribution based on relative frequencies of traffic light occurrences at each location for all of the plurality of real roadway scene images.

18. The non-transitory computer-readable medium of claim 17, wherein the operations further comprising filtering each of the plurality of augmented roadway scene images with a Poisson blending.

19. The non-transitory computer-readable medium of claim 18, wherein each of the plurality of augmented roadway scene images are filtered with the Poisson blending prior to training the pre-trained deep neural network model.

20. The non-transitory computer-readable medium of claim 17, wherein the distribution is a first distribution, and wherein the operation (f) includes:
determining a second distribution indicting likely traffic light dimensions at the selected location based on relative frequencies of dimensions of traffic lights located at the selected location in any of the plurality of real roadway scene images,
selecting dimensions for the traffic light image by sampling the second distribution, and
superimposing the traffic light image onto the selected real roadway scene image at the selected location to generate the augmented roadway scene image, wherein the traffic light image includes the selected dimensions.

* * * * *